June 25, 1957 — A. P. WINTER — 2,797,000
APPARATUS FOR UNLOADING RAILWAY CARS
Filed July 7, 1954 — 10 Sheets-Sheet 1

INVENTOR
AUGUST P. WINTER
By Roy E. Raney
ATTORNEY

June 25, 1957  A. P. WINTER  2,797,000
APPARATUS FOR UNLOADING RAILWAY CARS
Filed July 7, 1954  10 Sheets-Sheet 2

INVENTOR
AUGUST P. WINTER
By
ATTORNEY

June 25, 1957  A. P. WINTER  2,797,000
APPARATUS FOR UNLOADING RAILWAY CARS
Filed July 7, 1954  10 Sheets-Sheet 4
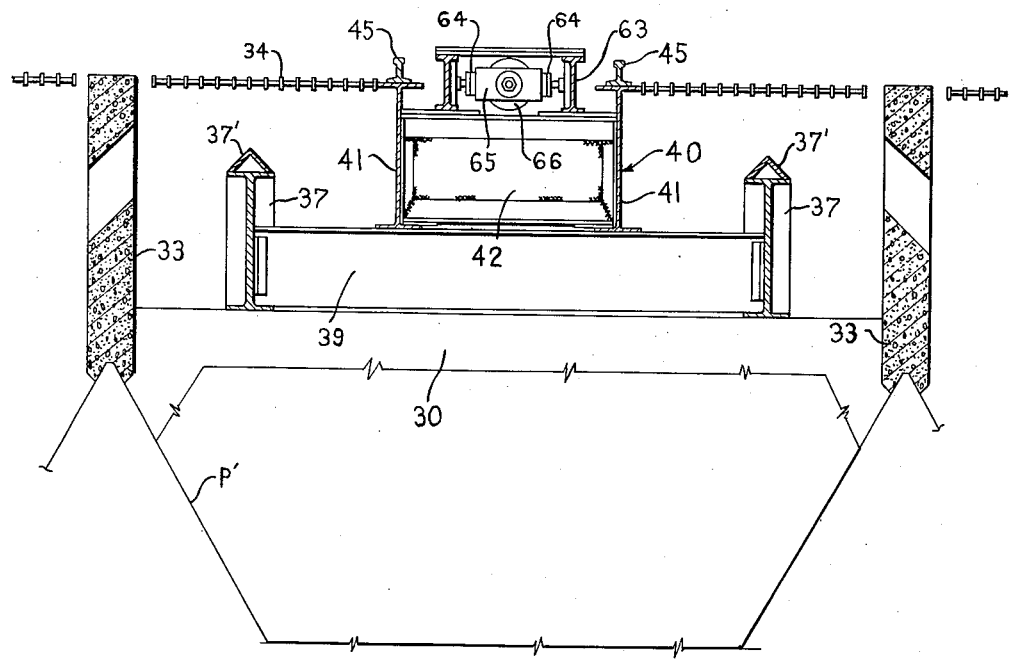
FIG. 4
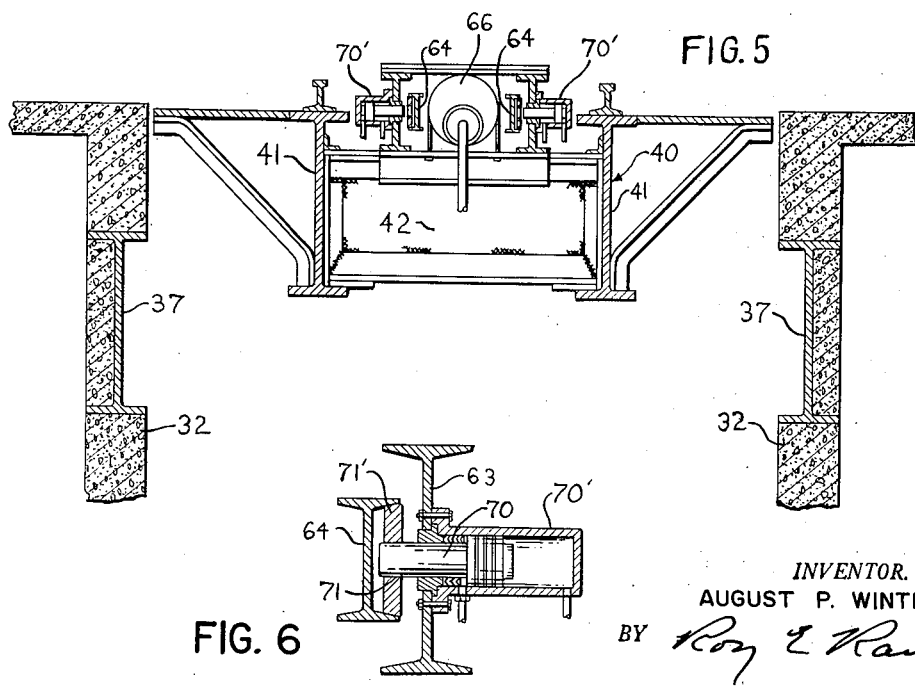
FIG. 5
FIG. 6
INVENTOR.
AUGUST P. WINTER
BY Roy E. Raney
ATTORNEY June 25, 1957   A. P. WINTER   2,797,000
APPARATUS FOR UNLOADING RAILWAY CARS
Filed July 7, 1954   10 Sheets-Sheet 5
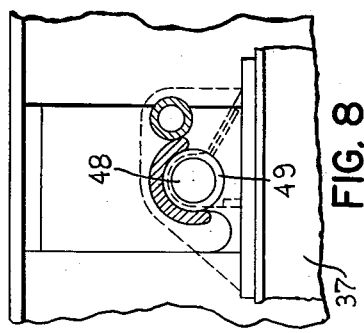
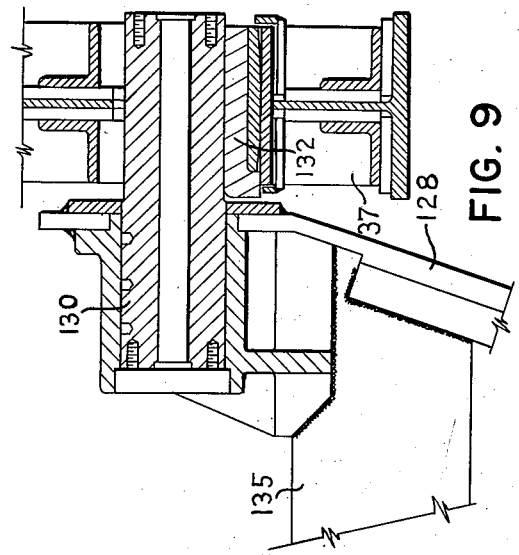
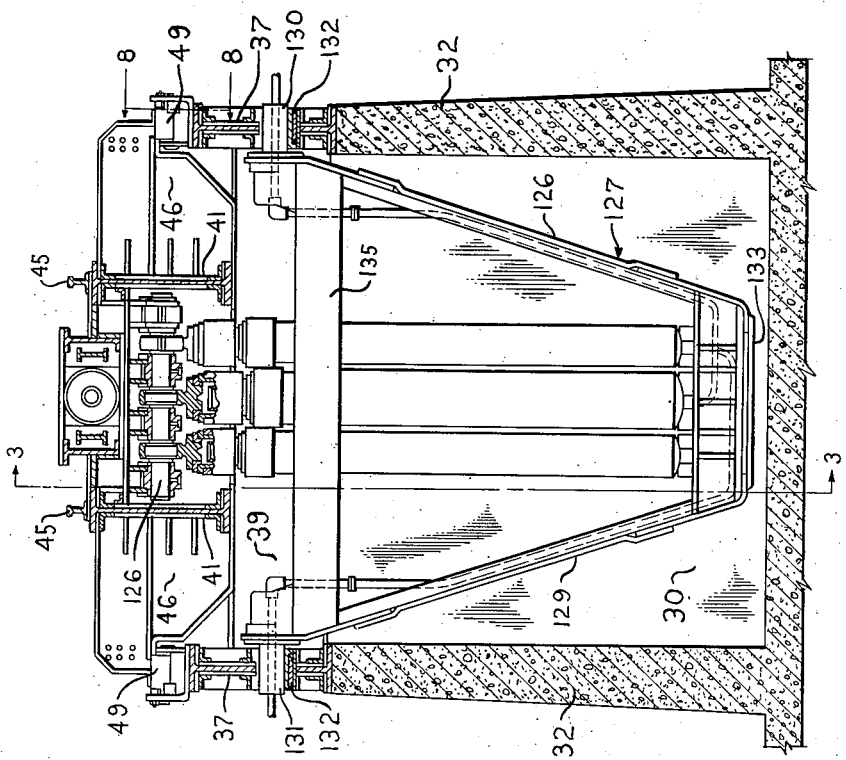
INVENTOR.
AUGUST P. WINTER
BY
ATTORNEY June 25, 1957　　　　　A. P. WINTER　　　　　2,797,000
APPARATUS FOR UNLOADING RAILWAY CARS
Filed July 7, 1954　　　　　　　　　　　　　　　10 Sheets-Sheet 6
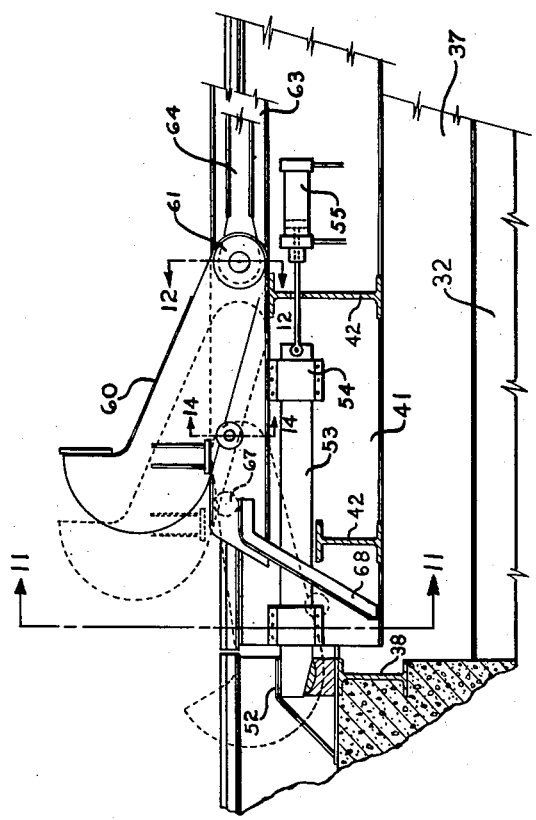
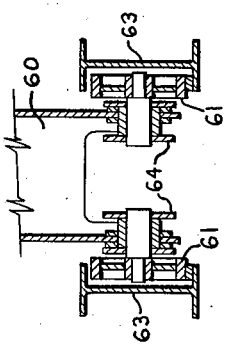
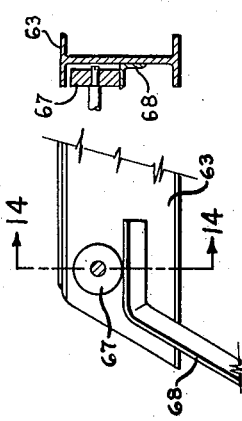
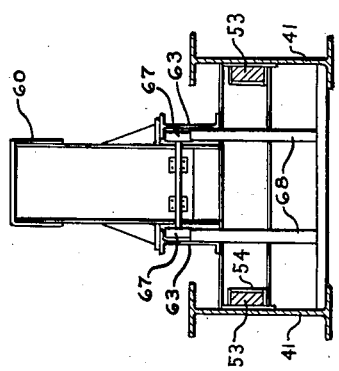
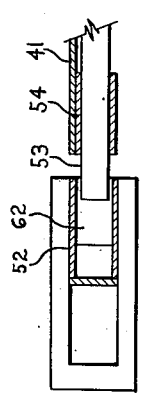
INVENTOR
AUGUST P. WINTER
By Roy E. Raney
ATTORNEY June 25, 1957
A. P. WINTER
2,797,000
APPARATUS FOR UNLOADING RAILWAY CARS
Filed July 7, 1954
10 Sheets-Sheet 7
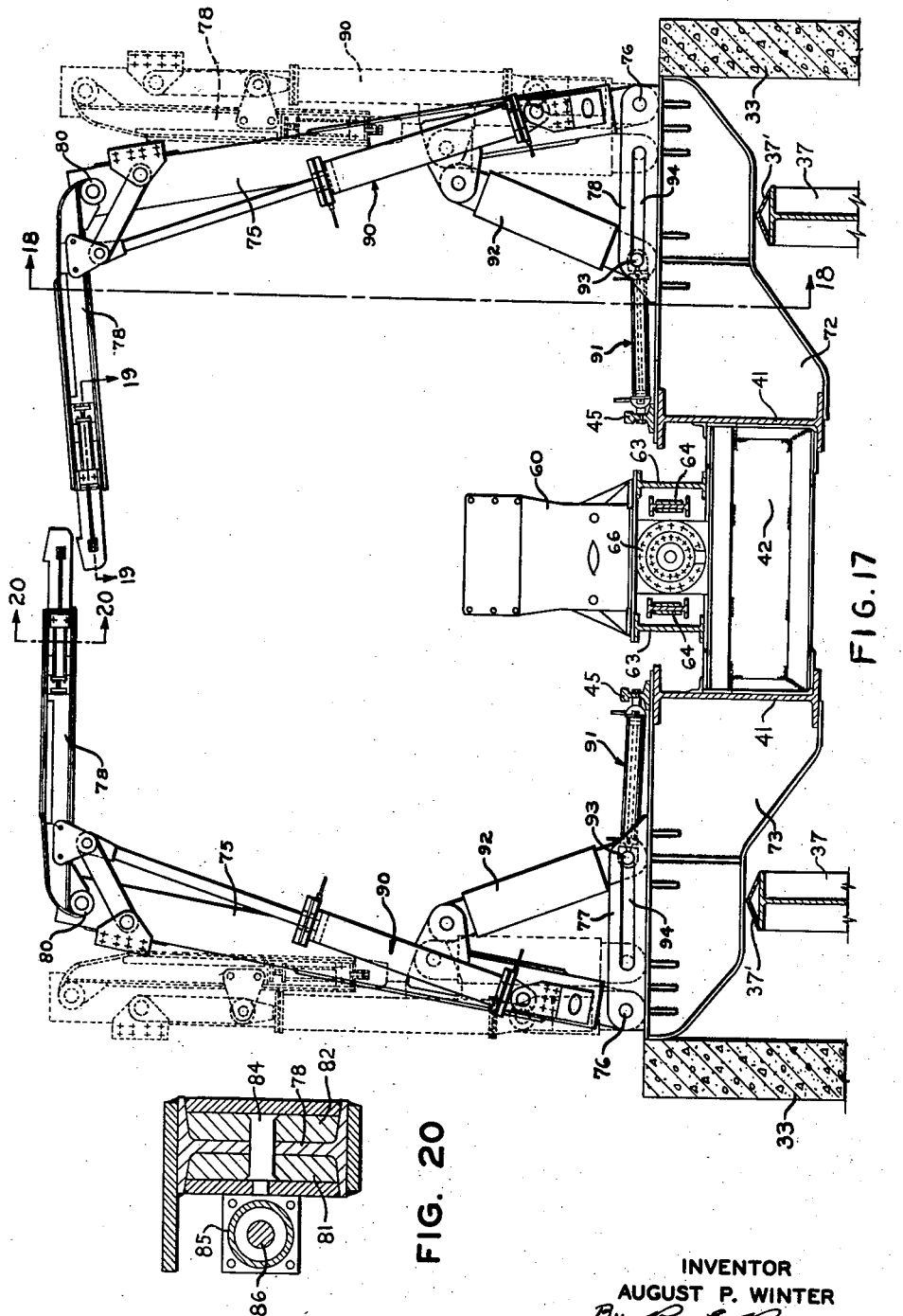
INVENTOR
AUGUST P. WINTER
ATTORNEY June 25, 1957  A. P. WINTER  2,797,000
APPARATUS FOR UNLOADING RAILWAY CARS
Filed July 7, 1954  10 Sheets-Sheet 8

INVENTOR
AUGUST P. WINTER
ATTORNEY

June 25, 1957     A. P. WINTER     2,797,000
APPARATUS FOR UNLOADING RAILWAY CARS
Filed July 7, 1954     10 Sheets-Sheet 9

INVENTOR
AUGUST P. WINTER
ATTORNEY

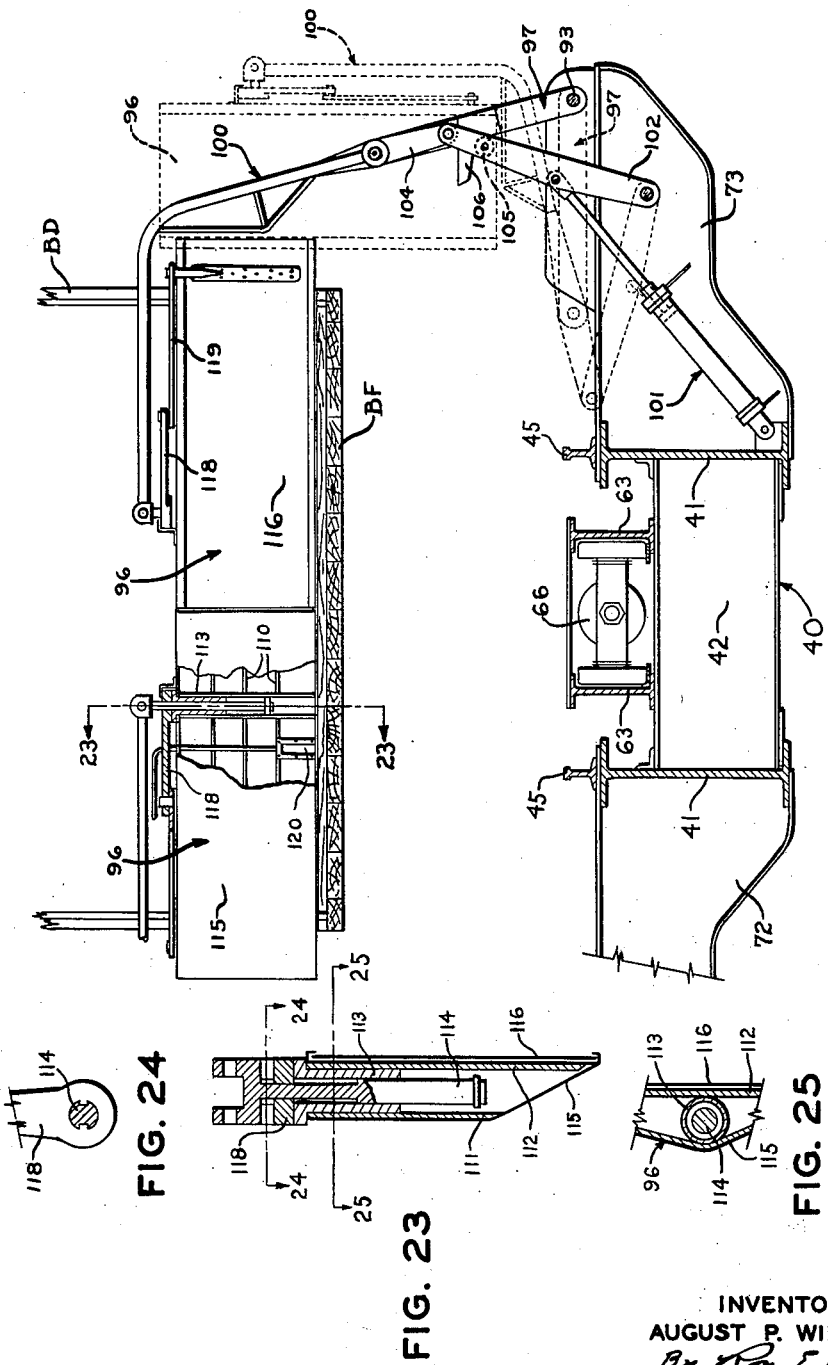

United States Patent Office 2,797,000
Patented June 25, 1957

2,797,000
APPARATUS FOR UNLOADING RAILWAY CARS

August P. Winter, Saint Vital, Manitoba, Canada, assignor to Winters' Dump Company, Ltd., Winnipeg, Manitoba, Canada, a corporation of Manitoba, Canada Application July 7, 1954, Serial No. 441,705

5 Claims. (Cl. 214—47)

The present invention relates to the unloading of granular bulk material from railway box cars and discharging the material into storage tanks or the like, according to the class and kind of material. The invention is particularly useful in grain receiving terminals, although it will have uses for handling other materials as well.

Most grain receiving terminals have trackage for receiving box cars of grain, the trackage including parallel tracks extending over pits formed between two parallel pit walls. The grain is generally shoveled from the cars into the pits from whence the grain is fed through shutters onto a straight line conveyor extending beneath the pits and lengthwise of the pit walls to a receiving leg which delivers the grain from the conveyor to the storage tank. Shoveling grain from the cars is slow, ties up the use of box cars during the harvest season, and requires considerable labor, all of which is economically wasteful.

It has been proposed heretofore to unload box cars by providing car supporting cradles arranged to up-end the cars and remove the grain therefrom by gravitation, but these unloaders have not been successfully adopted for one reason or another. One disadvantage of the prior unloaders is their inability to be practically installed in existing grain terminals. The present invention provides a box car unloader which can be installed in most existing grain terminals without materially altering the existing structures, and is capable of increasing the rate of car unloadings six-fold.

An example of one of the problems in installing car unloaders in existing grain terminals is that the grain receiving pits are generally adjacent to waterways and the depth of the pits is therefore limited by the water level and the height is limited by existing railway levels. The gravitational angles of repose of the grains and the angle required of the pit bottoms for self cleaning onto the conveyors combine with the heighth and depth restrictions to place a limitation on the grain capacity of the pits. It is important, therefore, that the pits be kept free of machinery and other obstructions so that the entire capacity of the pits can be utilized. The car unloader of the present invention has no obstructions in the pit nor does any of the mechanism require any limitations on the capacity thereof.

An important object of the invention is the provision of a railway box car dumper apparatus which can be installed across existing grain pits having an endless conveyor therebeneath extending transversely of a box car on the dumper, and the mechanism for operating the dumper being entirely free of the pits so that the capacity of the pit is unimpaired.

A further object of the invention is the provision of a car dumping apparatus having a unitary frame which is adapted to be installed crosswise of an existing grain pit and comprising elongated beams extending substantially beyond the ends of the pit to provide a rigid structure which spreads the load of the apparatus and load thereon along the ground adjacent to and well beyond the ends of the pit, the frame supporting a car cradle for alternate up-ending movements and also supporting power means beyond the pit ends to up-end the cradle.

Other objects and advantages of the invention will be apparent from the following description of preferred embodiments of the invention, reference being made to the accompanying drawings wherein:

Figure 4 is a sectional view taken along line 4—4 of Figure 2, but showing the grain hopper schematically and broken away;

Figure 5 is a detail view taken along line 5—5 of Figure 2;

Figure 6 is an assembly shown in Figure 5, but on a larger scale;

Fig. 7 is a transverse vertical sectional view taken along the line 7—7 of Fig. 2;

Figure 8 is a detail view taken along line 8—8 of Figure 7 and on a larger scale;

Figure 9 is an enlarged view of a part of a suspension assembly shown in Figure 7;

Figure 10 is a fragmentary view partly in section, illustrating both the car clamping elements and the elements which lock the ends of the up-endable car-supporting cradle when it is in its car receiving or horizontal position;

Figure 2:
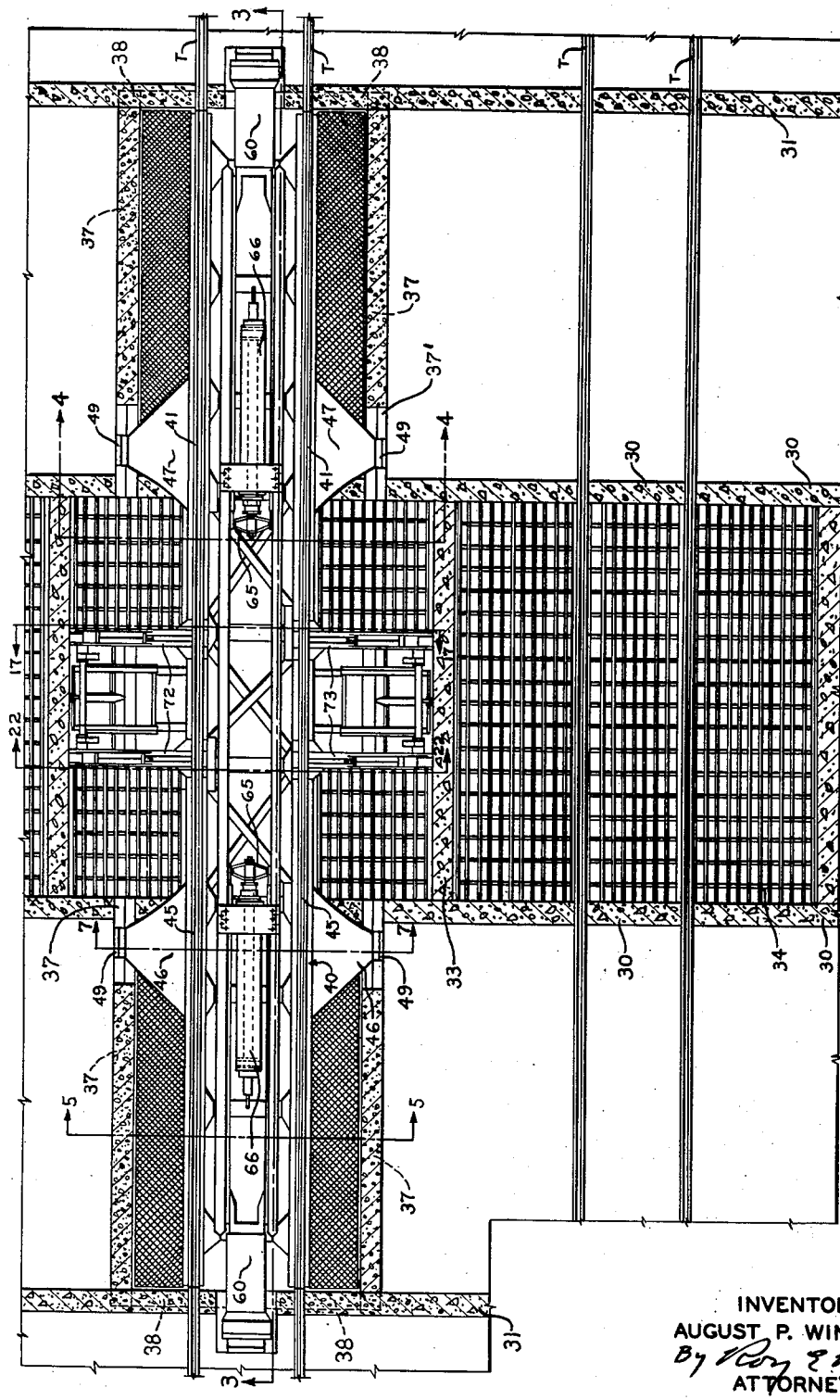
Figure 2 is a plan view of a grain car dumping apparatus embodying the invention.
Figure 3:
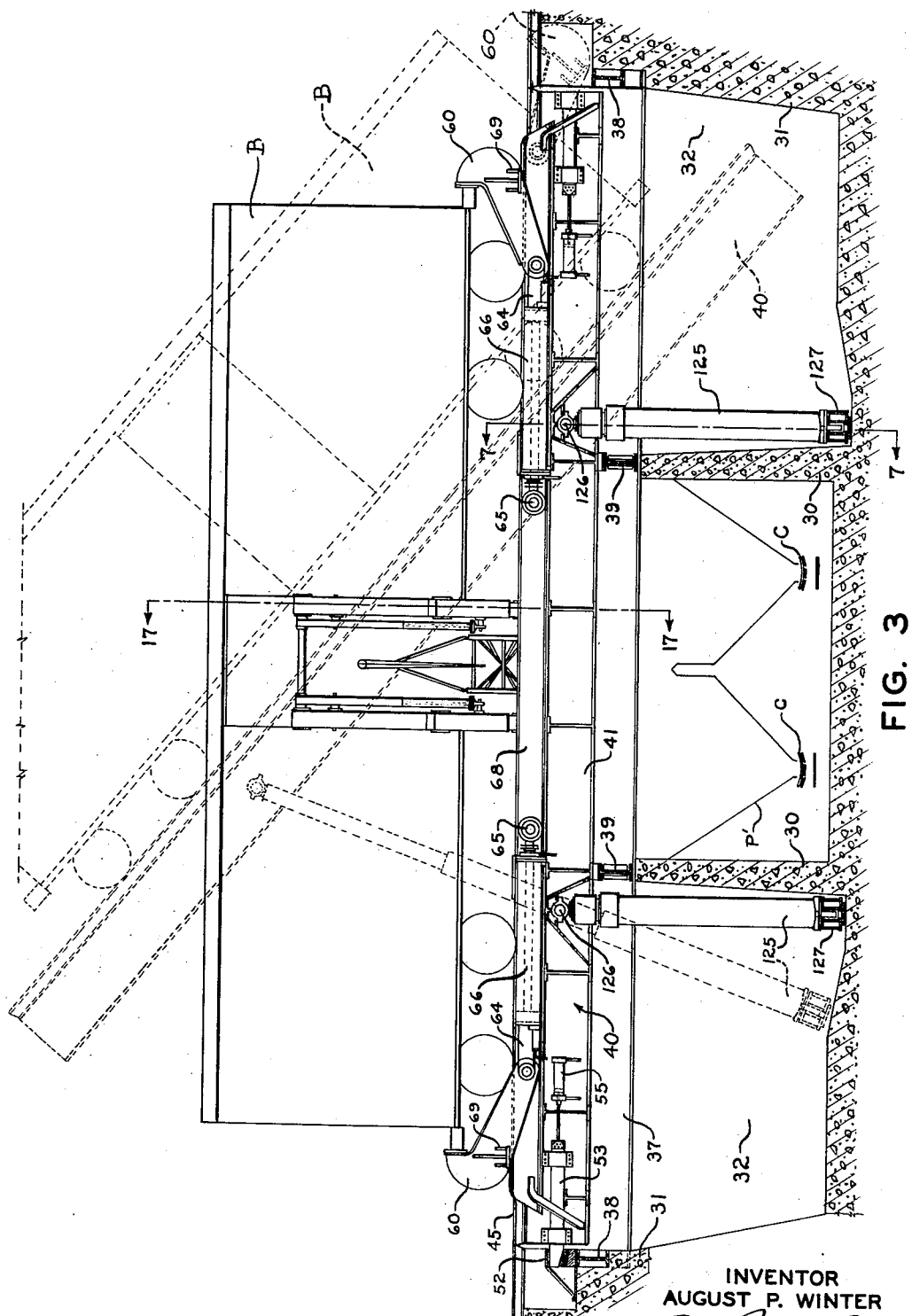
Figure 3 is an elevational view, partly in section, taken along the line 3—3 of Figures 2 and 7.
Figures 18, 19:
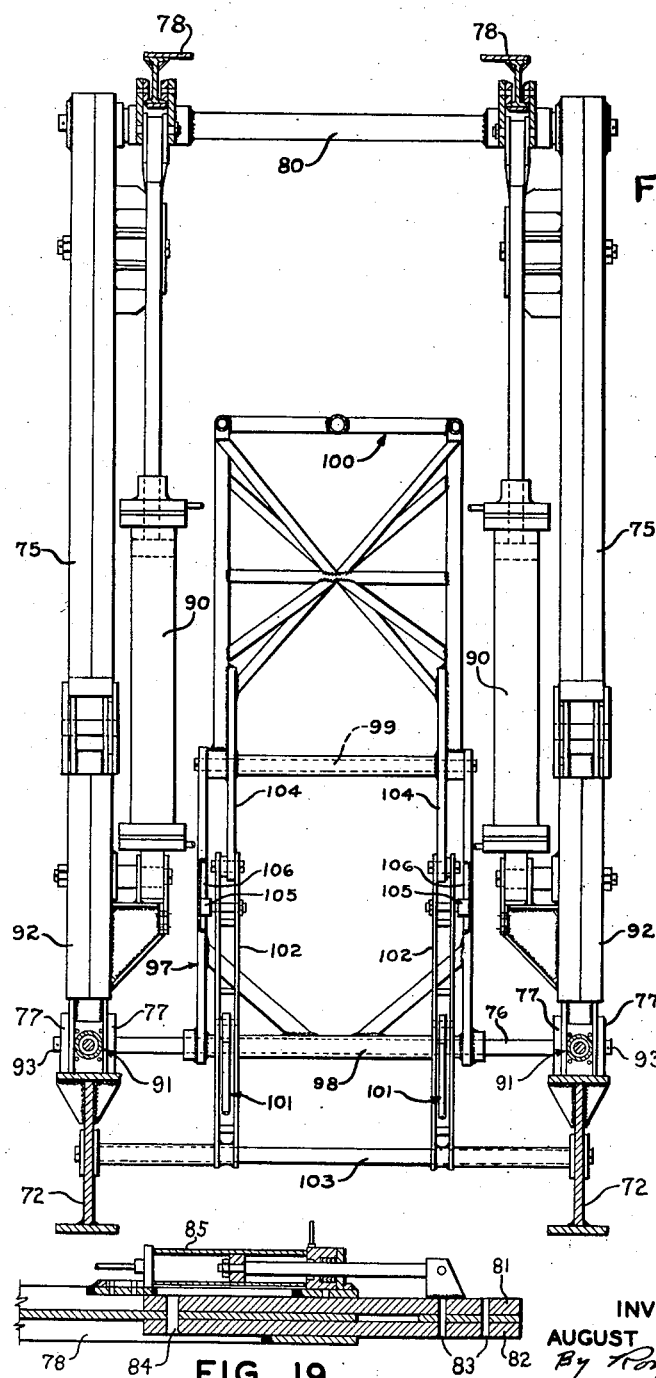
Figure 21:
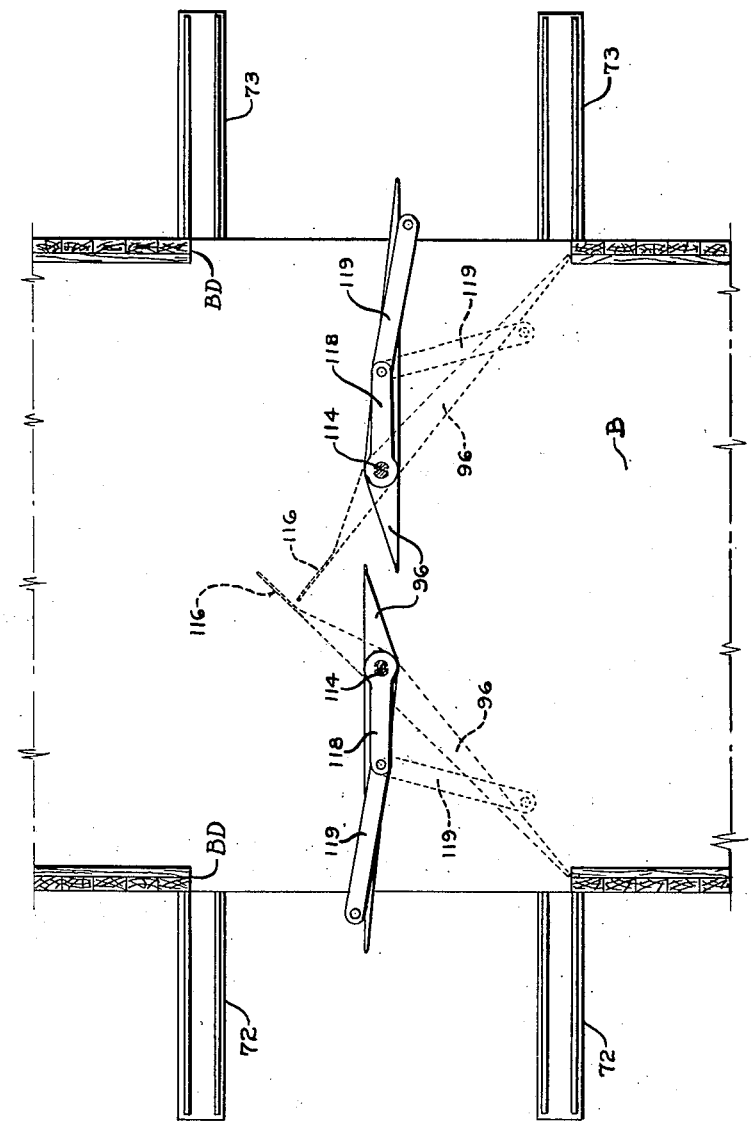

Figures 11 and 12 are detail sectional views of elements shown in Figure 10 the views being taken along lines 11—11 and 12—12, respectively, of Figure 10;

Figure 13 is an enlarged view of an idling clamp track assembly shown in Figure 10;

Figure 14 is a sectional view taken on lines 14—14 of Figures 10 and 13;

Figure 15 is a fragmentary view, on a larger scale, of the cradle locking mechanism shown in Figure 10;

Figure 16 is a sectional view taken on line 16—16 of Figure 15;

Figure 17 is an enlarged view, partly in section, taken along line 17—17 of Figures 2 and 3;

Figure 18 is an enlarged sectional view taken on the lines 18—18 of Figure 17;

Figures 19 and 20 are enlarged sectional views taken on the lines 19—19 and 20—20, respectively, of Figure 17;

Figure 21 is a schematic plan of the grain deflector elements;

Figure 22 is a fragmentary, elevational view illustrating the deflector elements;

Figure 23 is a sectional view on line 23—23 of Figure 22 but on a larger scale; and Figures 24 and 25 are sectional views taken on lines 24—24 and 25—25 of Figure 23.

Preferred forms of the invention are shown and described in connection with a grain receiving terminal installation and its operation in receiving, unloading and distributing the grain to storage tanks according to the class and kind of grain.

Figure 1:
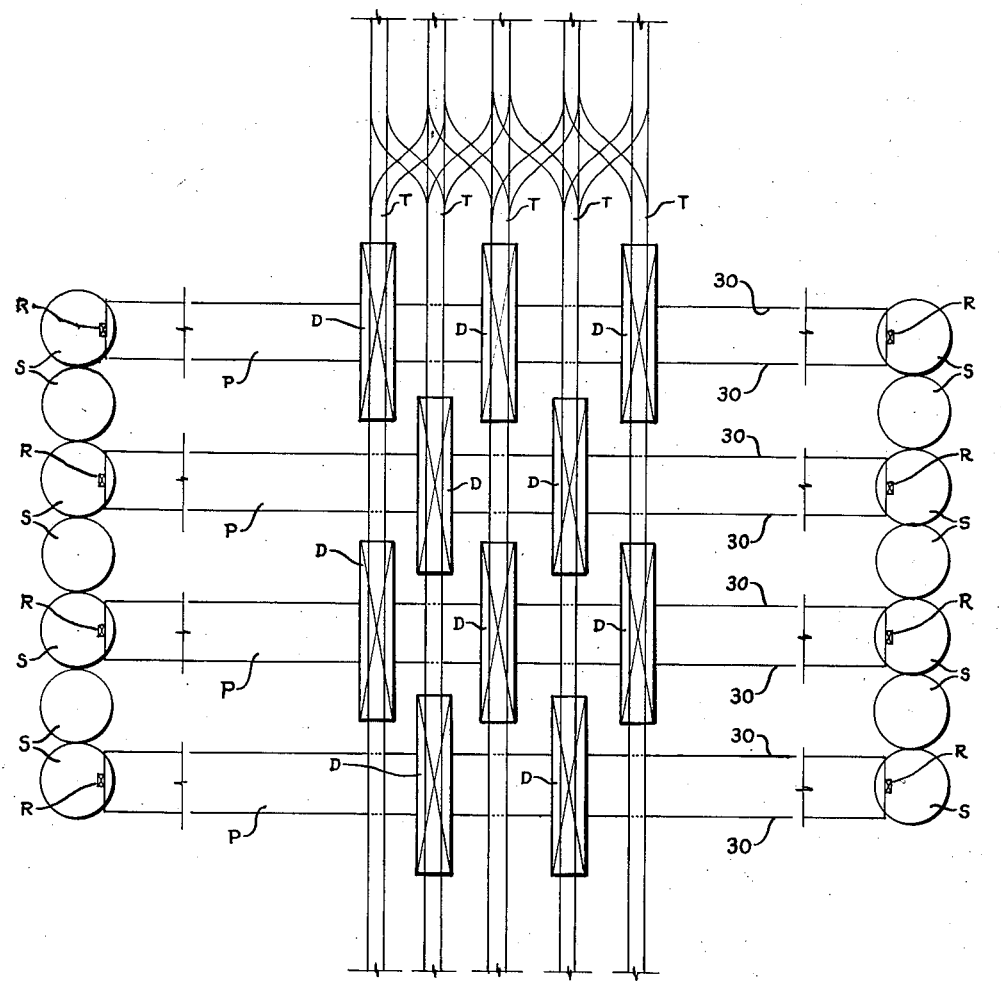
Figure 1 is a diagrammatic plan view of receiving trackage for a grain terminal.
Figure 1A:
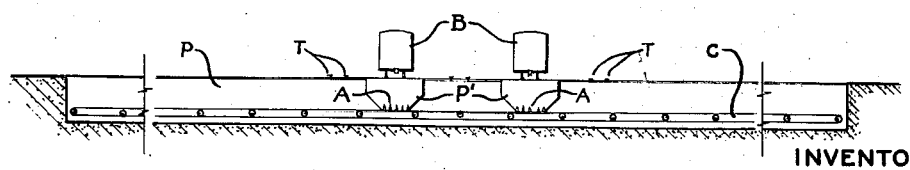
Figure 1A is a cross sectional view of Figure 1.

Referring to Figures 1 and 1A, the terminal trackage comprises a plurality of parallel tracks T extending crosswise over pit walls 30 having a pit P therebetween in which sub-pits P' are provided. The sub-pits, as may be seen in Figure 1A, are supported above the bottom of the pits proper and the tops thereof are open on opposite sides of the tracks which span or cross over the pit P so that grain flowing from opposite side doors of the box cars B over the pit can flow into the sub-pits therebeneath.

The grain emptied into the sub-pits P' is discharged as desired, by shutters A in the outlets thereof, onto a conveyor C which extends lengthwise of the pit walls and beneath the sub-pits of the pit and leads to a receiving leg R located at the sides of the track. The drawings show receiving legs at both sides of the trackage, but they may be on one side only. The receiving legs carry the grain into adjacent storage tanks S.

My improved car dumpers, indicated at D, span the pit walls 30 and the sub-pits P' and are operative to rapidly empty the grain from box cars thereon into the respective sub-pits, as explained more fully hereinafter.

Generally speaking, the cars of grain are stored on the tracks above the switches indicated at the top portion of Figure 1 and are brought onto the proper dumper according to the class and kind of grain contained therein. After the cars are emptied they are removed from the dumpers onto the tracks below the pits P, as viewed in Figure 1.

The pit construction shown is typical and includes two end walls 31 which are parallel to and spaced outside the pit walls 30 and are tied to the latter by intercostals 32. The pit P is subdivided by cross walls 33 which terminate short of the bottom of the pit and the conveyors C extend beneath these subdividing walls, as may be seen in Figure 3. The top of the pit P is covered by suitable flooring, such as grating 34, except for an opening for the cradle of the car dumper described hereinafter. The opening between the intercostals 32 are likewise closed by flooring.

The car dumper D has a frame comprising two spaced I beams 37 extending from one end wall 31 to the other and resting on the intercostals 32 seen in Figures 2, 3 and 7 and the ends of the beams are tied to the end walls. I beams 38 inset in the end walls brace the beams 37 at their ends, and the intermediate portions of the latter beams are braced by I beams 39 which overlie the top of the pit walls 30 and form extensions for the top sides of the pit, thereby increasing the capacity to a maximum. It will be seen that the frame ties the walls 30, 31 and 32 into a substantial footing structure which will withstand tremendous shocks without shifting and, in turn, the beams resting on the walls spread the load of the dumper apparatus over a considerable ground area, whereby a relatively low area unit load results which enables the apparatus to be installed without the use of pilings or other expensive and heavy load-bearing foundations.

Preferably, as shown in Fig. 4, inverted V-shaped deflectors 37' are attached to the top sides of the sections of the beams 37 extending over the pit to prevent grain from collecting thereon.

An up-endable car supporting cradle 40 is mounted on the frame and it is comprised of two parallel I beams 41 rigidly braced by suitable cross structure 42, and track rails 45 for receiving box cars rest on the tops of these beams. Two pairs of oppositely disposed, laterally projecting arm structures 46 and 47 are rigidly attached to the I beams 41 and each pair carries aligned axles 48 which are journaled in bearings 49 supported on the frame members 37. The bearings 49 are located in vertical planes slightly outside the pit walls 30 and each pair of aligned axles forms a pivot about which the cradle may be up-ended, as explained more fully hereinafter.

The ends of each beam 41 of the cradle 40 are releasably locked to the frame to support the weight of the cars entering and leaving the cradles by locking means comprising a lock-keeper 52, which is supported in a recess in wall 31 and is supported on cross beam 38, as illustrated in Figures 3 and 10. The keepers each have tapered openings and are adapted to receive complementarily formed locks bolts 53 slidingly supported in guides 54 attached to the beams 41. The bolts 53 are each moved to and from locking engagement with the keepers 53 by a hydraulic cylinder-piston motor 55 controlled by a suitable hydraulic system not shown since the details thereof are not essential to the understanding of the invention.

Combination car centering and holding clamp devices are provided at each end of the cradle 40 and they comprise J shaped assemblies 60 which lie between the cradle beams 41 and the inner ends are pivoted on rollers 61 which ride on the flanges of I beams 63 supported on the cross structure 42, as seen in Figures 10 and 12. The rollers are connected to two parallel links 64 which are attached to cross heads 65, respectively, of two hydraulic rams 66 attached to the bracing structure 42. The rams 66 are controlled by the hydraulic system mentioned previously. When the links are moved outwardly, the hooked end of the clamps 60 lie below the rail level, as shown in dotted lines at the right hand end of Figure 3 and when the rams draw the links inwardly, the clamps are raised into alignment with the car knuckles, as shown in full lines, by idlers 67 which ride on inclined tracks 68 attached to the beams 41 and 63. After the clamps 60 are raised, shoes 69 carried thereby, ride along the tops of the beams 63 to maintain the clamps in car engaging position. The clamps 60 are locked in the car clamping position by pistons 70 operating in cylinders 70' attached to the beams 63. The projecting ends of the pistons 70' enter notches 71 formed in a longitudinally extending bar 71' welded to the outsides of the links 64, as seen in Figure 6. The locking pistons 70 are controlled through the hydraulic system mentioned. Thus, the operator can accurately and rapidly center or position the cars B on the cradle by controlling the rams 66 and secure the car in position by the locking devices 70.

The central portion of the cradle 40 has two pairs of laterally projecting rigid arm structures 72 and 73 which support door forcing and grain baffle mechanisms. The door forcing mechanism is arranged to simultaneously force the lower portions of the coopering doors of the box cars inwardly and upwardly through the grain and to hold the doors above the grain during the car unloading operation, following which the doors are lowered. The door forcing mechanism on each side of the cradle are alike and only one is described in detail, but like reference characters appear on corresponding parts. The mechanism described comprises two generally vertical parallel davits 75 pivoted at the bottom thereof on a shaft 76 journaled in bars 77 welded in vertical planes to the arms 72. Pusher arms 78 are attached to a shaft 80 journaled in the upper ends of the davits 75. The arms 78 comprise I-beams having extendable end sections thereon formed of bars 81 and 82 on opposite sides of the web on the I-beam and secured together by pins 83 and 84, as seen in Figures 19 and 20, the pin 84 sliding in a longitudinal slot in the end portion of the arm 78. A hydraulic cylinder 85 is attached to each arm 78, and a piston 86 in the cylinder is attached to the bar 81 so that by controlling piston through the hydraulic system referred to, the operator can adjust the length of the arms 78 to extend to the various box car floors for engaging the bottoms of the doors.

The arms 78 are raised and lowered by hydraulic cylinder-piston motors 90 the cylinders thereof being pivoted to the davits 75 and the pistons attached to the arms, as shown in Figure 17. The davits 75 are adapted to be moved about their pivots by hydraulic cylinder-piston motors 91, the cylinder of each being attached to an adjacent rail 45 and the piston attached to the lower end of a link 92 by pin 93 sliding in slots 94 in the bars 77. The other end of the link 92 is pivotally attached to the davit 75.

When the door forcing mechanisms are idle, the davits 75 are in the dotted line positions shown in Figure 17, and it will be appreciated that these mechanisms are well within the side bounds of the vertical planes of walls 33 and provide ample clearance for the cars on the cradle.

The baffle mechanism comprises two blade type grain baffles 96, which are constructed alike and are adapted to be inserted in vertical planes through the side doorways BD of the box cars and along the car floor BF by hydraulically powered mechanisms, one of which is shown in Figure 22. These mechanisms are adapted to fold in moving the baffles to inactive position, as shown in the dotted lines in Figure 22. The baffle supporting mechanisms are located between the davits 75 and comprise a rectangular lever structure 97 which is pivoted on the shaft 76 by a bushing 98, and has a shaft 99 across the top thereof on which a goose-neck boom structure 100 is pivoted. The boom curves, as seen in Figure 22, and supports the baffle 96 at the end thereof. The lever 97 pivots about the shaft 93 between the positions shown in full and dotted lines in Figure 22 by a hydraulic cylinder-piston motor 101, one at each side of the lever, the pistons of which are connected to links 102 pivoted on a shaft 103 journaled in the arms 72 of the cradle. The upper ends of the links 102 are pivotally connected to rigid arms 104 welded to the boom structure and extending below the shaft 99. As the pistons of the motors 101 are moved inwardly, the links 102 are swung counter-clockwise and, acting through the arms 104, swing the boom clockwise about the shaft 99 and at the same time swing the lever 97 counter-clockwise. This folds the mechanism to the position shown in dotted lines and the baffle 96 is withdrawn from the car and up-ended to lie within the bounds of the dumper structure. To assist in stabilizing the baffle supporting boom, each link 102 carries an idler 105 which engages a knee block 106 curved to provide a dwell in which the idler centers to support weight of the lever structure 97.

The baffles 96 are comprised of a frame structure 110 to which backing or stiffener plates 111 and 112 are attached. A vertically extending bushing 113 is secured in the top of each baffle and receives a pin 114 rigidly attached to the boom 100 and provides a pivot about which the baffle can swing freely. The pin 114 is adapted to slide lengthwise in the bushing so that the baffle will rest upon the floor of box cars of various levels. The inner end of the pin is enlarged to engage the inner end of the bushing to lift the baffle from the car. The baffles 96 have sheet metal coverings 115, and on one face of each baffle grooves are formed along the top and bottom edges in which a plate 116 is adapted to slide to form a retractable extension of the leading edge of the baffle.

The plate 116 is moved in its groove by an arm 118 keyed to pin 114 and a link 119 pivoted to the arm 118 and attached at one end to the plate. When the baffle is extended transversely of the car, the arm and link are in line so that the plate 118 is drawn inwardly. When the baffle is turned in either direction from this position, link 119 is swung about its connection with the arm 118 and thereby moves the plate 116 outwardly to form an extended grain baffle or deflecting surface. This action is illustrated in Figure 12 in the full and dotted lines positions.

The pivot pins 114 for the baffles are located adjacent to the leading edges of the baffles so that grain movement lengthwise of the car deflects the baffles to extend the leading edges into the oncoming grain and swings the trailing edges against the far side of the adjacent car doorway. This movement extends the plates 116 so that the baffles form a wedge which divides the grain and deflects it through both doorways. As seen in Figure 12, the leading edges of the baffles are pointed to facilitate insertion into the grain in the car.

Preferably, a hydraulically driven vibrator 120 is attached to the frame of each baffle 96 and imparts a vibration thereto which expedites the flow or gravitation of grain along the baffle surfaces. The vibrators may be of any suitable construction, such as that commercially available.

The cradle 40 is adapted to be alternately up-ended in opposite directions about its axles by hydraulic rams 125 which have the pistons thereof pivotally connected to axles 126 attached to the cradle between the beams 41 and in axial alignment with the axles 48. The ram cylinders are oscillatorially supported on the frame members 37 by stirrup-like structures 127 comprised of two heavy leg members 128 and 129 having axles 130 and 131 at the upper ends which are journaled in bearing structure 132 supported on the members 37 and directly beneath the bearings 49. The lower ends of the legs 129 and 130 join a yoke 133 in which the lower ends of the rams 125 are supoprted, and the upper ends of the legs are tied together by a brace beam 135. The hydraulic lines for the rams extend through the axles 130 and 131 and along the insides of the legs 128 and 129. By this arrangement of supporting the rams 125, the lower ends of the rams swing outwardly from the pit walls 30 as the pistons thereof elevate the cradle and swing inwardly above the pit walls as shown in dotted lines in Figure 3. Thus, the axles 126 can be located but a slight distance outside the vertical planes of the pit walls which enables the cradle to be up-ended at the required angles with a minimum of lift of the rams. Furthermore, the movement of the cradle as described enables the lifting mechanism to be placed entirely outside the pit walls so that the grain capacity of the pits need not be reduced by obstructions or changes in form.

Another advantage gained in supporting the rams for swinging movement relative to the pit walls is that the force of the rams is fully utilized in elevating the cradle about its axles since there is no loss in lateral components of force. Thus, the power requirements are at a minimum.

A typical cycle of operation of the car dumper is as follows: A box car of grain is rolled onto the cradle 40 and the sliding doors thereof are blocked open. The operator then actuates the centering and locking clamps 60 to position the car relative to the door forcing and baffle inserting mechanisms and the locking pistons 70 are actuated to lock the clamps. This centering operation may require as little as five seconds time. The door forcing mechanisms are then actuated simultaneously to open the coopering doors, if of the type nailed to the door posts, the operator controlling the extensions 81 and 82 to the arms 78 to engage the floor as the arms move inwardly so that the doors can be raised inwardly and upwardly through the grain and be supported above the grain level. As the coopering doors are forced as described, the grain held by them is freed to flow out the doorways and into the pit below. This door forcing and grain flow generally requires about thirty seconds time. The grain baffles 96 are then inserted into the car doorways centrally thereof and in a plane at right angles to the longitudinal line of the car. This operation may require about five seconds and little if any grain is disturbed. One of the rams 125 is then operated to up-end the cradle about the set of axles 48 remote from the ram and the lift of the ram is controlled so that it requires approximately ninety seconds to elevate the cradle to a position of 27 degrees to horizontal. The rate of elevation is preferably maintained uniform as I have found that this slow rate causes gravitation of the grain at a lower angle of incline than faster and non-uniform rates of movement. I have found that the up-ending rate is critical to successful operation since rapid or non-uniform rate causes the grain to stick and fail to flow. The hydraulic control of the lifting mechanism provides the slow, uniform movement desired. The rate of elevation is controlled to that which maintains a maximum flow of grain, and with the grain flowing out both doorways, one end of the car will be unloaded by up-ending the car not more than 26 to 28 degrees to horizontal. Thus, the center of gravity of the cradle, car and its contents can be maintained between the vertical planes through the axles 48 which eliminates the hazard of the center of gravity shifting outside this area and causes the car and cradle to tip beyond its gravitational returning point. It will be understood that the initial flow of grain turns the baffles 96 to cause the grain to be deflected out the doorways. After the up-ended portion of the car has emptied of grain, the extended ram 125 is retracted at a relatively rapid rate, such that the cradle is returned to horizontal in about fifteen seconds. The other lifting ram 125 is then operated in a similar fashion as that described to up-end the opposite end of the cradle. The initial flow of grain in the opposite direction swings the baffles 96 to a position to deflect the grain out the side doorways as described previously and the remaining grain is emptied into the pit. The up-ended cradle and car are returned to horizontal by the rapid return described previously, after which the baffles 96 are withdrawn, and the door forcing mechanism lowered and withdrawn. The lock bolts 53 are then moved into their keepers 52, the lock pistons 70 retracted and the clamping members 60 are moved to their lowered position and the car removed from the cradle.

The entire unloading cycle may be accomplished in from five to six minutes as against about one-half hour per car under prior box car unloading practices.

By my invention I have provided apparatus for unloading grain or other granular materials from box cars in a fraction of the time required heretofor whereby substantial economies can be effected in the handling of the material and in freeing the box cars with a minimum of demurrage. The unloader can be economically installed in most existing grain terminals and elevators by reason of the novel frame, cradle and lifting cam arrangements.

It is to be understood that while I have shown but one form of the invention, other modifications, adaptations and uses thereof may be effected without departing from the invention as defined in the appended claims.

Having thus described my invention, I claim:

1. Structure for unloading railway cars laden with material, such as grain, comprising a pit having opposite load-bearing end walls and disposed beneath a railway level for receiving material dumped from a railway car; a car cradle support structure including two coextending main beams extending through and substantially beyond the planes of the end walls of said pit; a cross beam interconnecting said main beams adjacent each of the ends thereof; two spaced cross beams interconnecting intermediate portions of said main beams adjacent to the respective end wall planes, said mean beams and said cross beams defining a unitary, rigid structure, the portions of said main beams extending beyond said end wall planes being supported by the ground therebeneath, whereby the load of said support structure is borne along ground extending substantially along and beyond the end walls of said pit; an elongated railway car-carrying cradle extending over said pit and disposed between vertical planes passing respectively through said main beams; bearing means carried by that portion of said cradle support structure consisting of said beams adjacent the planes of the end walls of said pit and forming two rotational axes disposed in parallel adjacent relation to the last-named planes and extending transversely relative to said cradle and about which said cradle may be pivoted for alternate up-ending movement thereof; and lifting means carried by that portion of said support structure which consists of said beams beyond the opposite end walls of said pit and connected with said cradle for alternately tilting the same about the respective bearing means.

2. The combination as defined in claim 1, wherein said bearing means are carried by the main beams of said cradle support structure.

3. Structure for unloading railway cars laden with material, such as grain, comprising a receiving pit beneath a railway level, said receiving pit including two opposed load-bearing end walls, two outer pits disposed one adjacent to each of the end walls of said receiving pit, said outer pits each having the opposed side walls extending laterally from the adjacent end wall of said receiving pit, the respective side walls of said two outer pits being in alignment; a cradle support structure including two spaced coextending main support beams extending across said receiving pit and having substantial portions thereof projecting beyond the end walls of said receiving pit and extending along and supported on the respective aligned side walls of said outer pits, two cross beams, one supported by each of said end walls of said receiving pit and interconnecting said main beams intermediate the ends thereof, other cross beams interconnecting the ends of said main beams and supported by the ground therebeneath, said main and cross beams defining a rigid, unitary structure; an elongated railway track carrying cradle extending parallel to and centrally disposed relative to the main beams of said support structure and spanning said receiving pit; bearing means carried by that portion of said cradle support structure consisting of said beams adjacent to the end walls of said receiving pit and supporting said cradle for pivotal movement about generally horizontal axes disposed respectively at opposite ends of said receiving pit; and lifting means in each outer pit for alternately tilting said cradle about the respective bearing means.

4. The combination as defined in claim 3, wherein said outer pits are formed with load-bearing end walls disposed in outwardly spaced relation to the end walls of said receiving pit, and supporting the cross beams of said support structure which interconnect the ends of said main beams.

5. The combination as defined in claim 3, wherein said lifting means comprise a pair of hydraulic rams carried by said support structure.

References Cited in the file of this patent

UNITED STATES PATENTS

| | | |
|---|---|---|
| 291,355 | Keibler | Jan. 1, 1884 |
| 520,271 | Sanchez | May 22, 1894 |
| 814,610 | Lefferts | Mar. 6, 1906 |
| 840,248 | Pates | Jan. 1, 1907 |
| 1,146,267 | McGann | July 13, 1915 |
| 1,201,005 | Wallace | Oct. 10, 1916 |
| 1,542,951 | Perkins | June 23, 1925 |
| 1,668,530 | Romine | May 1, 1928 |
| 1,865,633 | Kidder | July 5, 1932 |
| 1,973,163 | Davis | Sept. 11, 1934 |
| 2,505,194 | Loss | Apr. 25, 1950 |
| 2,608,311 | Findley | Aug. 26, 1952 |